Dec. 17, 1935.  E. NEWNHAM  2,024,383
FOOD MIXER AND FRUIT JUICE EXTRACTOR
Filed Oct. 31, 1932  2 Sheets-Sheet 1
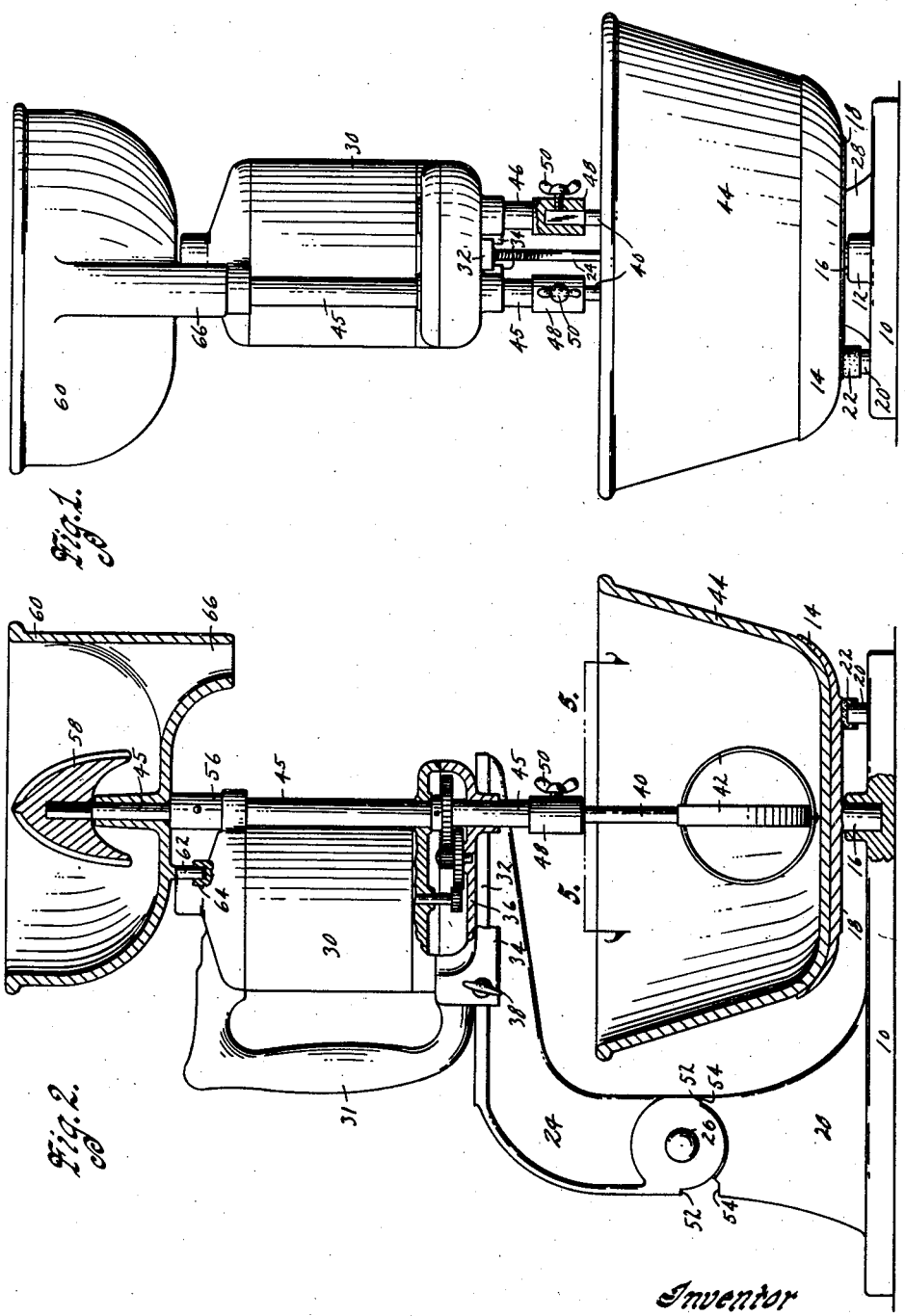
Inventor
~ Eugene Newnham ~
By Bair, Freeman & Sinclair
Attorneys
Witness
H. S. Munzenmaier Dec. 17, 1935.　　　　E. NEWNHAM　　　　2,024,383
FOOD MIXER AND FRUIT JUICE EXTRACTOR
Filed Oct. 31, 1932　　　2 Sheets-Sheet 2
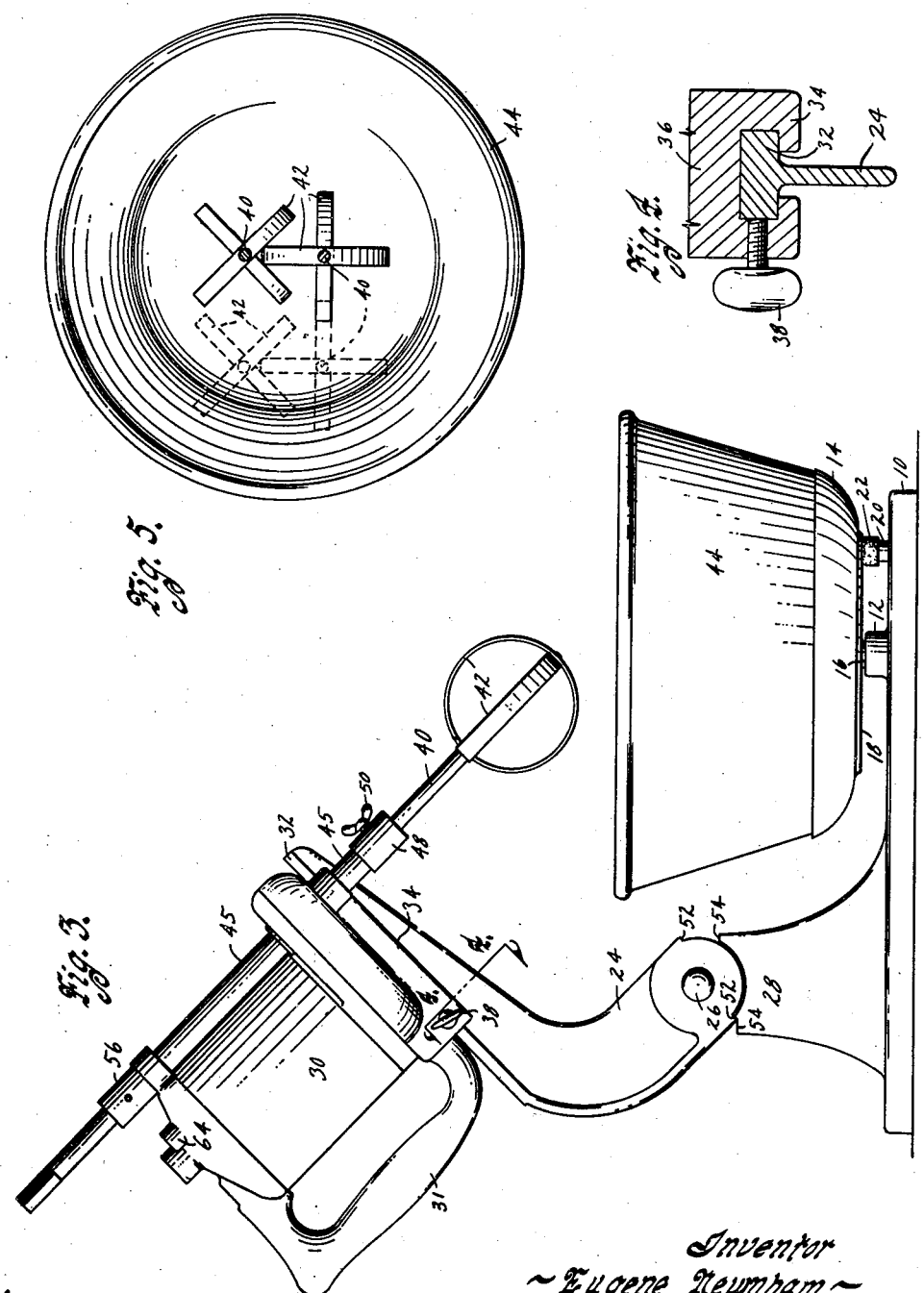
Inventor
~Eugene Newnham~
By Bair, Freeman & Sinclair
Attorneys Patented Dec. 17, 1935

2,024,383

UNITED STATES PATENT OFFICE 2,024,383

FOOD MIXER AND FRUIT JUICE EXTRACTOR

Eugene Newnham, St. Louis, Mo., assignor to Knapp-Monarch Company, Belleville, Ill., a corporation of Missouri Application October 31, 1932, Serial No. 640,440

2 Claims. (Cl. 259—84)

An object of my invention is to provide an appliance for mixing food and extracting fruit juices, the appliance being comparatively simple and inexpensive from a manufacturing standpoint.

A further object is to provide a food mixer and fruit juice extractor in which a mixing bowl is removably mounted and food mixer elements are arranged so that they can be located within the mixing bowl off center thereof to cause rotation of the bowl during the mixing operation and thereby more thoroughly mix the entire contents of the mixing bowl.

A further object is to provide a brake to prevent the mixing bowl from turning too fast.

Still a further object is to arrange the mixing elements so that they are adjustable radially relative to the mixing bowl so as to have more or less turning effect as desired for the particular food being mixed.

Still a further object is to provide a mixing element driven by an electric motor which is supported on a pivoted arm so that the arm can be adjusted to a position permitting easy placement and removal of the mixing bowl relative to the appliance.

Still another object is to provide an extractor in the form of a removable extractor bowl mounted on the motor of the appliance, a reamer being provided within the extractor bowl for reaming fruits, such as lemons, oranges and the like, for extracting the juice therefrom.

With these and other objects in view my invention consists in the construction, arrangement and combination of the various parts of my device, whereby the objects contemplated are attained, as hereinafter more fully set forth, pointed out in my claims and illustrated in the accompanying drawings, in which:

Figure 1 is a front elevation of a food mixer and fruit juice extractor embodying my invention.

Figure 2 is a side elevation of the same, partly in section.

Figure 3 is a side elevation showing the parts adjusted to a different position.

Figure 4 is a sectional view on the line 4—4 of Figure 3; and

Figure 5 is a sectional view on the line 5—5 of Figure 2.

On the accompanying drawings, I have used the reference character 10 to indicate a base. The base 10 has thereon a boss 12. A bowl support 14 in the form of a shallow dish is provided with a central stud 16 adapted to be received in the boss 12 whereby the bowl support 14 is revolvable relative to the base 10.

An annular track 18 is provided on the bottom of the bowl support 14. A projection 20 is adapted to frictionally coact therewith to serve as a brake to prevent free rotation of the bowl support 14. The projection 20 may be capped with a fibre cap 22 or one formed of a suitable material having the required coefficient of friction to properly check the rotation of the bowl support 14.

A supporting arm 24 is pivoted at 26 to an upstanding leg 28 on the base 10. It is adapted to support a motor 30. The supporting arm 24 has a platform 32 with which hooked edges 34 of a gear casing 36 are slidably associated. The gear casing 36 is secured to the motor 30. A set screw 38 is provided for retaining the motor 30 in any adjusted position relative to the platform 32.

Through suitable gearing, shown in Figure 2 mixer shafts 40 are driven in opposite directions. Mixer elements 42 are secured to the lower ends of the shafts 40 and depend within a mixing bowl 44 when placed on the bowl support 14. In Figure 2 I have shown a cage-like form of mixing element, while in Figure 3 I have shown a blade-like form. These are preferably removable relative to primary shafts 45 and 46, connector members 48, having set screws 50 or connector members of any desired construction, being provided for this purpose. Either one or two of the mixing elements may be used.

The motor 30 besides being slidable relative to the supporting arm 24, is removable therefrom so that the motor can be supported by a handle 31 thereon when it is desired to use it for mixing in a bowl not supported on the base 10.

As is obvious in Figure 3, the supporting arm 24 can be swung to a position facilitating removal of the bowl 44 from the bowl support 14.

The arm 38 is provided with stops 52 adapted to engage with stops 54 of the legs 28 at the two extreme positions of swinging movement of the arm 24 as shown in Figures 2 and 3 respectively.

By making the motor 30 adjustable radially relative to the bowl support 14, the mixer elements 42 may be centrally rotated as shown in Figure 2 by solid lines or rotated off center any desired degree, for instance as shown by dotted lines. Thus, depending on the consistency of the food in the bowl 44, the mixer elements can be adjusted for exerting more or less revolving tendency on the bowl through the medium of the food being mixed. The brake 22 prevents free rotation of the bowl so that it does not gain speed during the mixing operation, as would be the case if the brake were not provided.

The primary shaft 44 extends upwardly through a boss 56. It is adapted to have a fruit reamer 58 detachably mounted on the upper end thereof. An extractor bowl 60 is removably positioned on the boss 56 and thereby supported on the motor 30. To prevent rotation of the extractor bowl a projection 62 thereof extends into a perforation 64 of the motor. The extractor bowl is provided with a discharge spout 66.

In the fruit juice extracting operation the fruit is held stationary over the reamer and the juice extracted therefrom flows out of the discharge spout 66. A glass or other receptacle can be held thereunder to catch the juice.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a food mixer, a base, a bowl supported thereon, a supporting arm pivotally mounted on said base and having a substantially horizontal portion overhanging said bowl, a motor mounted slidably on said overhanging portion of said supporting arm and a pair of mixer elements extending downwardly from said motor, said overhanging portion of said arm being located between said mixer elements.

2. In a food mixer, a base, a bowl supported thereon, a supporting arm mounted on said base and overhanging said bowl, a motor mounted slidably on said supporting arm, a pair of synchronized mixer shafts supported by said motor at right angles to said arm, mixer elements on said mixer shafts having overlapping paths of rotation, said shafts extending downwardly from said motor on each side of said arm.

EUGENE NEWNHAM.